United States Patent [19]  [11] 4,158,599
Andrews et al.  [45] Jun. 19, 1979

[54] METHOD OF REFUELING REACTOR

[75] Inventors: Harry N. Andrews, Export, Pa.;
Richard S. Orr, Jacksonville, Fla.;
Robert J. French, Pittsburgh, Pa.

[73] Assignee: Westinghouse Electric Corp., Pittsburgh, Pa.

[21] Appl. No.: 656,914

[22] Filed: Feb. 10, 1976

Related U.S. Application Data

[60] Division of Ser. No. 310,725, Nov. 30, 1972, abandoned, which is a continuation of Ser. No. 53,202, Jul. 8, 1970, abandoned.

[51] Int. Cl.$^2$ ............................................. G21C 19/02
[52] U.S. Cl. .......................................... 176/30; 176/22
[58] Field of Search ..................................... 176/30-32, 176/22, 87, 36 R

[56] References Cited

U.S. PATENT DOCUMENTS

| | | | |
|---|---|---|---|
| 3,276,965 | 10/1966 | Leyse | 176/22 |
| 3,282,793 | 11/1966 | Jamrog | 176/30 |
| 3,318,780 | 5/1967 | Bohmann et al. | 176/87 |
| 3,607,629 | 9/1971 | Frisch et al. | 176/36 |
| 3,775,246 | 11/1973 | Frisch et al. | 176/36 |

FOREIGN PATENT DOCUMENTS 43-10357  4/1968  Japan ........................................ 176/30

Primary Examiner—Harvey E. Behrend
Attorney, Agent, or Firm—J. R. Campbell; Z. L. Dermer

[57] ABSTRACT

There is disclosed a method for rapid refueling of a nuclear reactor. The upper package including the head and upper internals and control rods of the reactor includes a missile shield and by engagement with the shield is moved to a refueling position in a single lifting operation exposing the core in the lower package. The fuel assemblies are then replaced. The removal of the control rods from the core with the upper package is compensated for by an increase in the concentration of neutron absorber, such as boron including $B^{10}$, in the medium in which the core is immersed. Typically, the refueling can take place in a few days, at intervals of two to six months. During refueling a fraction of the assemblies are replaced. Because of the facility for rapid refueling and consequent lower time cycle for refueling, the fuel can be of low enrichment and the concentration of neutron absorber in the reactor coolant medium can be decreased. All replacement assemblies can be moved in a cart into the reactor containment in a single operation and replaced from the cart, or the assemblies can be moved one-by-one into the containment and replaced as they are presently.

2 Claims, 3 Drawing Figures

FIG. I

METHOD OF REFUELING REACTOR

This is a division of application Ser. No. 310,725 filed Nov. 30, 1972, now abandoned, which is a continuation of application Ser. No. 53,202 filed July 8, 1970, now abandoned.

CROSS REFERENCES TO RELATED APPLICATIONS

This application relates to the following applications filed concurrently herewith or filed previously as indicated and, to the extent necessary or desirable, incorporated herein by reference:

U.S. Pat. No. 3,836,429 entitled "Means for Rapidly Exposing The Core of A Nuclear Reactor For Refueling" by Erling Frisch and Harry N. Andrews.

U.S. Pat. No. 3,836,430 entitled "Cable Support Structure For Enabling A Nuclear Reactor To Be Refueled Rapidly" by Erling Frisch and Harry N. Andrews.

U.S. Pat. No. 3,766,006 entitled "Rapidly Refuelable Nuclear Reactor" by Erling Frisch and Harry N. Andrews.

U.S. Pat. No. 3,752,737 entitled "Combination of Nuclear Reactor and Missile Shield" by Erling Frisch and Harry N. Andrews.

U.S. Pat. No. 3,685,123 entitled "Means For Retaining and Handling Reactor O-Ring Seals" by Erling Frisch.

U.S. Pat. No. 3,837,694 entitled "Hydraulic Head Closure Mechanism" by Erling Frisch and Harry N. Andrews.

U.S. Pat. No. 3,607,629 entitled "Reactor Refueling Method" by Erling Frisch and Harry N. Andrews.

BACKGROUND OF THE INVENTION

This invention relates to the nuclear reactor art and has particular relationship to nuclear reactors which serve as primary sources for power-supply facilities. A demand which is imposed on such reactors is that they be refueled periodically. Refueling operations carried out in accordance with the teachings of the prior art consume about 3 to 6 weeks.

While this invention is applicable to reactors of other types, it is uniquely applicable to the refueling of reactors of the pressurized water type, P.W.R. In the interest of concreteness this application, in its descriptive text, confines itself to P.W.R.'s assuming the pressure vessel to be vertical.

Such nuclear reactor (U.S. Pat. No. 3,607,629 above) includes a pressure vessel having a body sealed by a head. The body is typically 40 feet long and 15 feet in diameter and includes the fuel core, which typically may include 193 fuel assemblies and the upper and lower internals. The head is typically 15 feet in diameter and in the past has been sealed by about 52 studs.

The reactor includes control rods which are inserted in, or retracted from, the fuel for control purposes by control rod control mechanisms. The mechanisms operate in housings which are sealed pressure tight to the head and extend above the head. There are typically 60 such mechanisms each including drive or drives, typically a piston, a control rod drive shaft connected to the drive and extending from the mechanism housing through the head, each shaft engaging associated control rods.

In refueling, in accordance with the teachings of the prior art, the studs are detensioned and removed from the vessel flange and the head and mechanism housing are lifted and removed exposing the control rod drive shaft and the control rods. The control rod drive shafts are then disconnected from the control rods and removed with the upper internals and the refueling is carried out with the control rods in the core. After refueling the above described process is reversed.

The long shut down of several weeks which this method of refueling demands renders refueling at frequent intervals not practicable and the refueling in accordance with the teachings of the prior art takes place approximately annually.

It has been discovered in arriving at this invention that this annular refueling imposes severe restrictions on the initial or replacement fuel. Typically, the initial enrichment in fissionable material of the fuel must be sufficient to maintain the reactivity of the reactor for at least a year. Typically, this enrichment is of the order of 3.2%. Because of this higher initial enrichment the medium in which the fuel is immersed must have a higher concentration of neutron absorber such as boron. These conditions are imposed not only on the initial fuel but also on each replacement. In addition, the number of fuel assemblies replaced is based on the annual refueling cycle and must be a substantial fraction of the assemblies in the core.

Evaluation of the economic effects of refueling time reveals that there is large economic incentive in reducing materially the refueling time. Not only can the loss, resulting from the reactor being out of operation for long intervals, be reduced, but, in addition, because the refueling can take place at short intervals advantages are available in feasibility of using fuel of lower enrichment and in frequent replacement of a relatively small portion of the fuel assemblies during each refueling. In addition the concentration of neutron absorbing material in the medium in which the core is immersed, for example boron, in water, may be lower.

Typically in a pressurized water reactor annual refueling, demanding enrichment in fissionable material of the order of 3.2% requires a concentration in the water of about 1200 parts per million of natural boron typically including by weight 20% $B^{10}$ and 80% $B^{11}$ at the beginning of life with a consequent build-up of a high concentration of tritium, $H^3$, during life while the concentration of boron is being reduced to about 10 p.p.m. In a typical example, for a semiannual refueling cycle the initial enrichment is reduced and the concentration of boron at the start of life is reduced to 650 p.p.m. with consequent reduction in the $H^3$ generated; and for a three-months refueling cycle the enrichment is only 2.7% and the boron concentration at the start of life is reduced to 350 p.p.m.

It has been found that by refueling during an interval of three days about every three months a fuel saving amounting to about $14 per kilowatt can be realized.

It is an object of this invention to improve the economy of operation of a nuclear reactor and to provide a method of refueling a nuclear reactor which can be carried out in a short interval of only a few days permitting a short time cycle, of the order of three or six months between refuelings of the reactor and consequent reduction of initial enrichment in fissionable material of the fuel and low concentration of neutron absorbers, and with minimized reactor downtime for refueling.

SUMMARY OF THE INVENTION

In accordance with this invention the number of separate tasks to be performed in refueling are substantially reduced so that access to the pressure vessel is obtained rapidly. In addition cross transportation of the old and new assemblies is simplified and speeded up and refueling techniques are simplified and automated. The possibility of delays from maloperation is reduced by improving the reliability of each step of the refueling. The result is that refueling can be carried out in a few days conceivably under minimum electrical utility system load conditions, and the refueling cycle can be only three to six months.

Specifically, the studs are detensioned rapidly by hydraulically operated detensioners, as disclosed in U.S. Pat. No. 3,837,694. The missile shield, disclosed in U.S. Pat. No. 3,752,737 is then displaced locking the control rod control mechanisms in the retracted position in their housings without dependence upon electrical current flow, as disclosed in U.S. Pat. No. 3,766,006. The whole upper package including the missile shield, head of the pressure vessel, the control rod drive mechanisms and their drive shafts, the control rods and the upper internals, is then lifted and placed out of the way in a single lifting operation. The integral structure including the missile shield is disclosed in U.S. Pat. No. 3,836,429. The cables are on a pivoted cable tray, as disclosed in U.S. Pat. No. 3,836,430, and are sufficiently long so that they need not be, and are not, disconnected during the whole refueling operation.

The removal of the control rods during refueling requires that the boron concentration be increased, during refueling. It is of interest that the increase is to 2500 p.p.m. for an annular refueling cycle. For a six-month refueling cycle the boron concentration during refueling is reduced to 1880 p.p.m. and for a three-month cycle it is correspondingly further reduced.

The new replacement fuel assemblies are transferred in one operation into the containment where the open vessel is disposed and are in position for refueling. The spent fuel assemblies are likewise transferred out of the containment in one operation. A fuel transfer pit is provided in this containment where the spent assemblies may be retained temporarily.

Typically, in refueling, at 6 month intervals, one-fifth of the spent assemblies in the core are replaced. In this practice assemblies are removed from the center of the core and are replaced by assemblies outside of the center. The peripheral assemblies are then replaced.

Alternatively, a refueling technique may be adopted, wherein no fuel assembly rearrangement occurs. Typically where there are 193 assemblies in the core, 20 may be replaced directly during each refueling. The cycle is three-months. The replacements are in each case identified so that in about 2½ years all assemblies are replaced.

After the refueling the boron concentration is reduced to the required magnitude (for example 350 p.p.m. for a three month's cycle).

BRIEF DESCRIPTION OF THE DRAWING

For a better understanding of this invention, both as to its organization and as to its method of operation, together with additional objects and advantages thereof, reference is made to the following description taken in connection with the accompanying drawings, in which.

DETAILED DESCRIPTION OF THE PRACTICE OF THIS INVENTION

Figure 1:
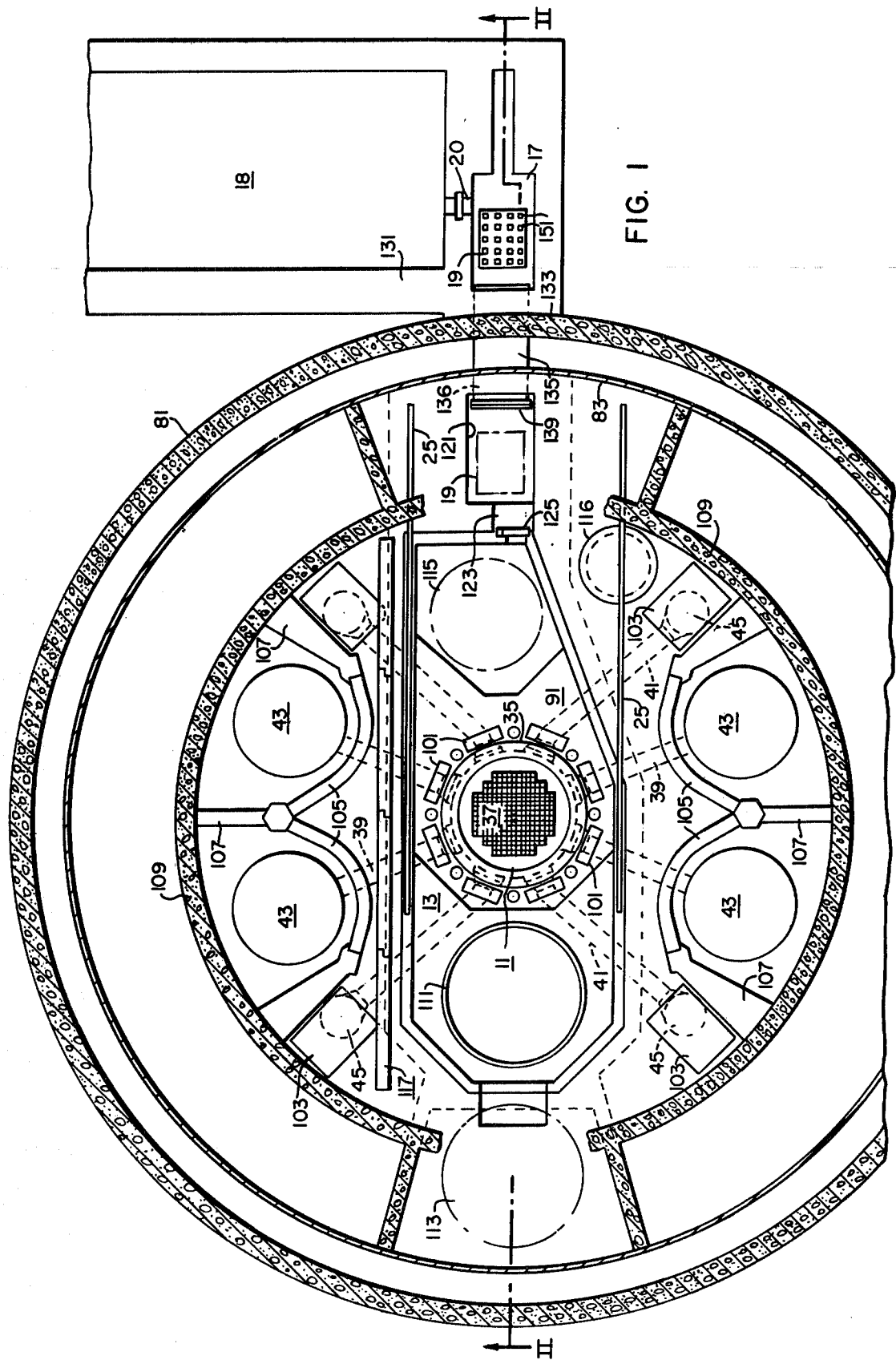
FIG. 1 is a plan view of apparatus for practicing this invention, with the upper package of the reactor and the crane removed.

The apparatus shown in the drawings includes a nuclear reactor 11 which is mounted in a pit 13. This apparatus also includes a lifting device 15, typically a crane, for lifting and moving the upper package of the reactor 11. The crane 15 includes the usual drives (not shown) necessary for operation and is preferably movable on a track (not shown). There is also a pit 17 for replacement apparatus. The cart 19 containing the replacement fuel before refueling and the spent fuel after refueling is temporarily retained in pit 17. There is a spent fuel pit 18 connected to the pit 17 through a gate 20. During refueling the pit 17 and the pit 13 are filled with water. In the event that there is a necessity to effect repairs the gate 20 is closed and the water is pumped from pit 17. A crane 23 is provided for carrying out the fuel replacement operation. This crane is movable on a track 25 and has the necessity movable mast 27 to hold and move the fuel assemblies.

The reactor 11 includes a lower package 31 and an upper package 33. For the details of the structure the reactor 11 and the above-listed U.S. patents (particularly patent No. 3,607,629) are referred to. For the purpose of the invention it is necessary only to describe briefly the features shown in FIGS. 1 and 2.

Figure 2:
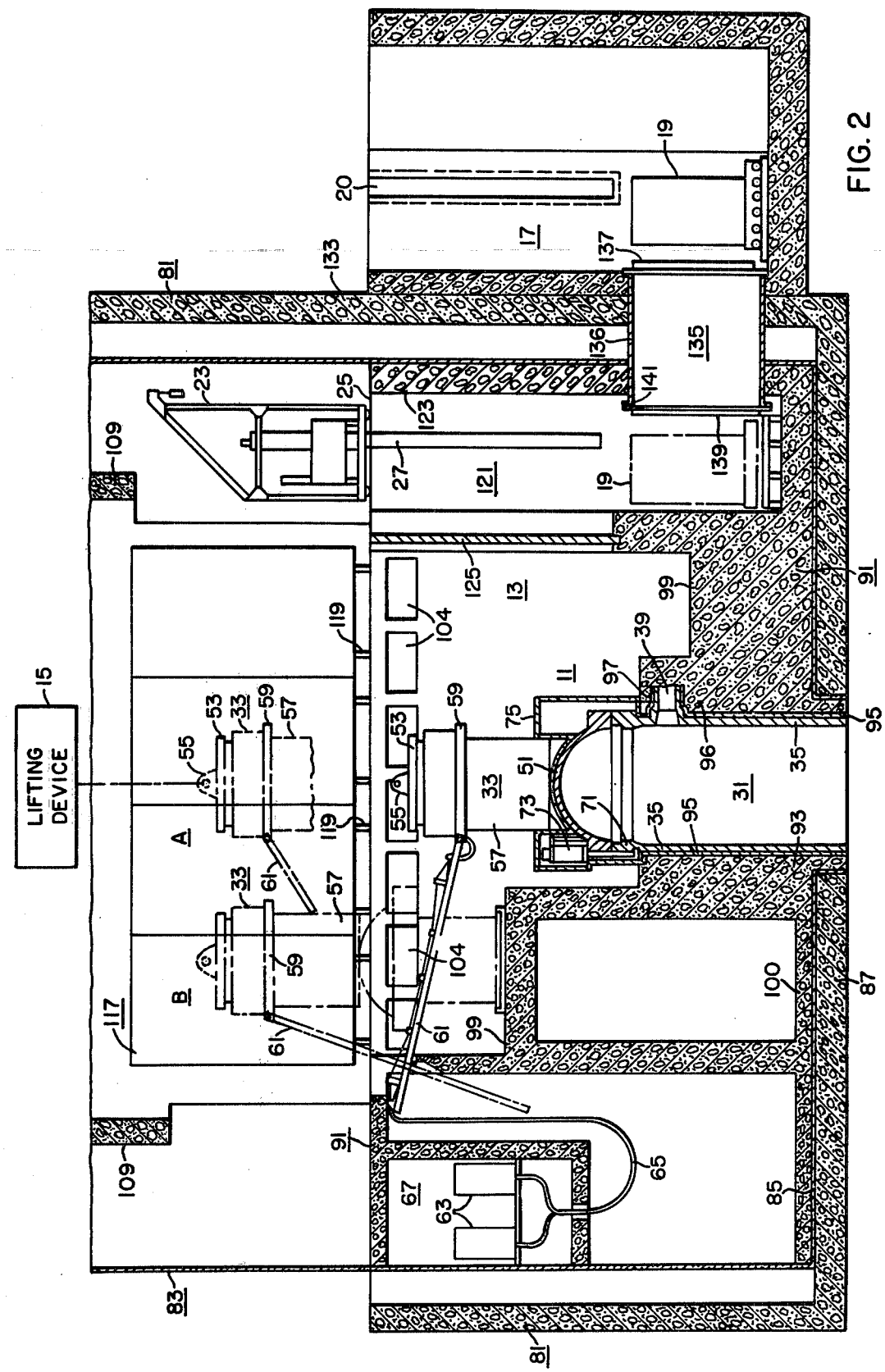
FIG. 2 is a view in section taken along line II—II of FIg. 1.

The lower package 31 includes the body 35 of a pressure vessel. Within the body 35 there is a fuel core 37 composed of fuel assemblies (FIG. 2). Conductors 39 and 41 are connected peripherally to the body 35 for transmitting fluid between steam generators 43 and the pressure vessel and between pumps 45 and the pressure vessel.

The upper package 33 includes the head 51 of the pressure vessel. The housings (not shown) for the control rid drive mechanism (not shown) are joined pressure-tight to the head 51. The driving pistons (not shown) the drive shafts (not shown), and the control rods (not shown) extend from the housings (not shown) through the head into the core 37. These drives, shafts, and control rods are held magnetically in the retracted position during refueling (see U.S. Pat. No. 3,766,006) and are removable as part of the upper package 33. The upper package also includes the missile shield 53. The shield 53 has a lifting lug 55 to which the lifting device 15 is connected for removal of the upper package 33. The casing 57 includng the control rod drive mechanisms (not shown) has a ring 59 on which a cable tray 61 is pivoted. The cables 65 are connected to the usual cabinets 63 in a compartment 67. Because the tray 61 is pivoted and the cables 65 hang loosely from the tray, the upper package may be moved without disconnecting the cables, (U.S. Pat. No. 3,836,430).

The head 51 is secured pressure-tight to the body 35 of the pressure vessel by studs 71. Each stud 71 is provided with a hydraulically operable detensioner 73 for rapid movement of the studs. Typically, there are 26 large studs rather than 52 smaller studs. The studs 71 and detensioners 73 and head 51 are enclosed in a thermal insulating housing 75.

The pit 13 is surrounded by an outer concrete building 81 which serves as a radioactive shield. Within building 81 there is a containment pressure shell 83, typically of steel, which has a base 85 that lines the base 87 of the building 81. The crane 23 and its tracks 25 are disposed within the shell 83.

Within the shell 83 there is a concrete inner structure 91 in which the reactor 11 and its associated apparatus such as the steam generator 43, the pumps 45 and fluid conductors 39 and 41 are mounted. The reactor 11 is disposed in the pit 13 which is part of this structure 91. The vessel 35 has linings 95 of thermally insulating material separated from the wall 93 of the pit by an air space (not shown). The conductors 39 and 41 pass through openings in this structure, and have linings 97 of thermally insulating material also separated from the walls 97 by air spaces. The stem generators 43 and the pumps 45 are supported from the base 100 of the structure. The components 39, 41, 43 and 45 and other like components are accessible or may be viewed through inspection hatches or openings 101 and 103 (see FIG. 1). The operating deck above the reactor is shielded from the generators 43 by arcuate concrete shields 105 which span walls 107 secured to an arcuate concrete structure 109 extending from the shell 83. Openings 104 are provided for venting the pit 13.

The base 99 is provided with a circular receptacle 111 to which the upper package 33 may be removed during refueling. There may also be receptacles 113 and 115 for storing the head 51 and the upper or lower internals (not shown) where necesssary. There is also a pressurizer 116 for maintaining the pressure during operation of the reactor 11.

The inner structure 91 is provided with a hatch cover 117 of steel and concrete shown raised in FIG. 2. This cover 117 is mounted on hinges 119 and when raised affords access to the reactor 11 and its associated apparatus. When lowered, during normal operation of the reactor 11, the cover 117 affords shielding protection.

Within the shell 83 there is a cavity 121 where the cart 19 with replacement fuel assemblies (or, after refueling, with the spent assemblies) is disposed during refueling. This cavity 121 is enclosed by concrete walls 123 and is separated from the inside of the inner structure 91 by a removable gate 125.

The refueling pit 17 is a cavity in the wall 131 of the spent fuel storage pit 18. This wall 131 on one side abuts the adjacent wall 133 of the concrete shield 81. There is a passage 135 extending through the walls 131, 133 and 123. The passage 135 has a cylindrical metal wall 136. It is closed on the side of the pit 17 by a gate 137 which is slidable between open and closed position. On the side of the cavity 121 this passage is closed by a cover 139 which is bolted to a flange 141 of the wall defining the passage 135.

OPERATION

The refueling is carried out under water to protect against radioactivity. It is essential that the upper internals be maintained under water as they are raised as part of the upper package. The water level is then raised as the upper package is raised. But, the water level must be maintained below the detensioners 73, the cable tray 61 and the cable 65. Initially, the inside of the pit 13 is dry. At the start of the refueling the fuel cart 19 is disposed under water in pit 17 with replacement assemblies 151. The boron concentration is now appropriately raised to the refueling magnitude (2500) p.p.m. for annual cycle and 1440 p.p.m. or less for shorter cycles. The control rod drive mechanisms (not shown) are operated to remove the rods (not shown) to the retracted position (U.S. Pat. No. 3,766,006). The detensioners 73 are now operated and the studs 71 tilted out of locking position. The upper package is now lifted to position A (FIG. 1) and moved to the receptacle 111 in position B. At this point, or before, the level of the water in the pit 13 is raised. The level of the rising water during this operation is always maintained above the upper internals in the rising package but below the stud detensioners, cable tray 61 and cables 65.

Gate 137 is then raised and cart 19 moved into cavity 121. Gate 125 is now raised and refueling carried out by crane 23. The replacement assemblies 151 one-by-one, replace spent assemblies; the spent assemblies being placed in the cart 19.

After the replacement of fuel assemblies has been completed the cart 19 of spent assemblies are removed to the pit 17 whence the assemblies may be transferred under water into pit 18. The upper package is replaced as the water level is gradually lowered. The studs are secured sealing the head 51 to the body 35. The shield 53 is lowered to operating position and the control rods reinserted in core 37. The boron concentration of the water in the reactor vessel is now reduced to operating magnitude (1200 p.p.m. for annular refueling cycle, 650 for semiannual and 350 for three-months). The reactor 11 may now be set into normal operation.

In lieu of refueling from a cart 19 of assemblies, the assemblies may be brought one-by-one into the containment 13 as they are at present.

Figure 3:
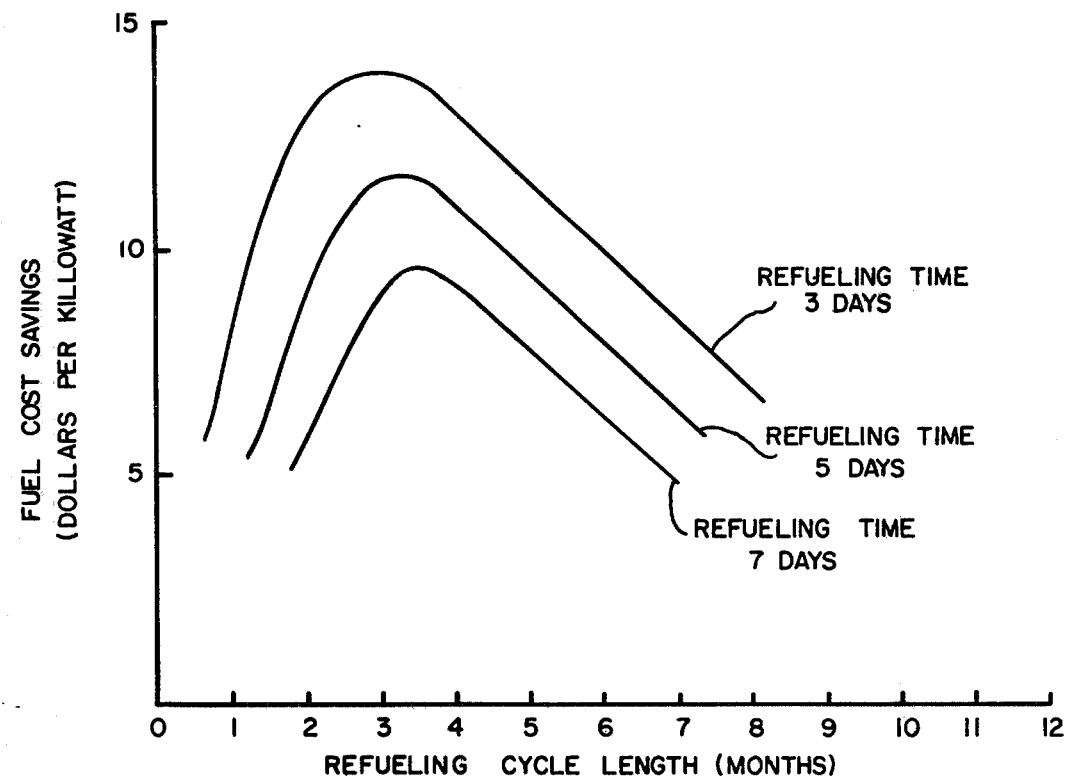
FIG. 3 is a graph illustrating the advantages of this invention.

FIG. 3 shows the relationship between refueling cycle in months, plotted horizontally, and fuel cost saving in dollars per kilowatt, plotted vertically. Curves are plotted for three parameters of refueling time. FIG. 3 shows that the fuel savings is a maximum for a three-months cycle and refueling time of three days.

While a method of practicing this invention has been disclosed herein, many modifications thereof are feasible. This invention then is not to be restricted except insofar as is necessitated by the spirit of the prior art.

We claim:

1. The method of refueling, in a relatively short time interval, a nuclear reactor having a pressure vessel, a core therein having fuel assemblies to be replaced; fuel in said fuel assemblies having an enrichment of about 2.7% to 3.2% in fissionable material, an upper package including the head of the pressure vessel, control rods and control rod drive mechanisms and housings, electrical cables connected at one end to said control rod drive mechanisms and adapted for connection at their other ends to a power source, a lifting device and said head being held to said vessel by studs having stud tensioners and detensioning means for detensioning said studs, the said method comprising the steps of:

increasing the concentration of neutron absorbing material to its refueling magnitude in coolant circulated through the core, said refueling magnitude being that amount and concentration of neutron absorbing material which corresponds to the fissionable material enrichment in the fuel assemblies and which is needed to compensate for neutron activity upon withdrawal of control rods from the core;

actuating said detensioning means to unlock and remove said studs thereby unlocking said head from said vessel, lifting said upper package in a single lifting operation to a prepared position away from said pressure vessel thus affording access to said core, flooding borated water equal to said refueling magnitude into a pit in which the reactor is located before said upper package is removed from the pressure vessel;

raising the level of said water in the pit to a point just below the stud detensioners and cables, and then maintaining said level by uniformly increasing the level of said water in the pit during the time of lifting said upper package from the pressure vessel; and by virtue of such access replacing said fuel assemblies in said core at relatively short intervals by replacing about ten percent of the spent fuel assemblies when the reactor is refueled at three month intervals; and replacing about twenty percent of the spent fuel assemblies when the reactor is refueled at six month intervals.

2. The method according to claim 1 including the step of removing fuel assemblies from the center of the core and replacing them with fuel assemblies outside of the center, and replacing the assemblies from outside of the center with fresh assemblies, when the reactor is refueled at six month intervals; and replacing each removed assembly directly with a fresh assembly, without rearranging the fuel assemblies, when the reactor is refueled on a three month basis.

* * * * *